United States Patent [19]

Perry et al.

[11] Patent Number: 5,427,993
[45] Date of Patent: Jun. 27, 1995

[54] PROCESS FOR FORMING A HOMOGENEOUS OXIDE SOLID PHASE OF CATALYTICALLY ACTIVE MATERIAL

[75] Inventors: Dale L. Perry, Hercules; Richard E. Russo, Walnut Creek; Xianglei Mao, Berkeley, all of Calif.

[73] Assignee: Regents, the University of California, Oakland, Calif.

[21] Appl. No.: 114,868

[22] Filed: Aug. 30, 1993

[51] Int. Cl.$^6$ .......................... B01J 23/02; B01J 23/38
[52] U.S. Cl. ........................................ 502/328; 502/5; 502/326; 502/330; 502/340; 502/344; 204/157.41
[58] Field of Search .................. 502/5, 522, 328, 330, 502/326, 340, 344; 204/157.41; 427/596, 597, 581

[56] References Cited

U.S. PATENT DOCUMENTS

| | | | |
|---|---|---|---|
| 2,223,777 | 12/1940 | Beek et al. | 502/337 |
| 3,402,022 | 9/1968 | Hayes et al. | 502/328 |
| 5,028,577 | 7/1991 | Michaels et al. | 502/328 |
| 5,168,097 | 12/1992 | Araya et al. | 427/596 |

OTHER PUBLICATIONS

Baleva, M. I., et al., "Laser-Assisted Sputtering of $Pb_{1-x}Cd_xSe$ Films", *Journal of Materials Science Letters*, vol. 5, 1986, pp. 533–536.

Balooch, M., et al., "Y—Ba—Cu—O Superconducting Films Produced by Long-Pulse Laser Vaporization", *Appl. Phys. Lett.*, vol. 55, No. 2, Jul. 10, 1989, pp. 197–199.

Cheung, J. T., et al., "HgTe and CdTe Epitaxial Layers and HgTe-CdTe Superlattices Grown by Laser Molecular Beam Epitaxy", *J. Vac. Sci. Technol.*, vol. A 4, No. 4, Jul./Aug., 1986, pp. 2086–2090.

Dijkkamp, D., et al., "Preparation of Y—Ba—Cu Oxide Superconductor Thin Films Using Pulsed Laser Evaporation from High $T_c$ Bulk Material", *Appl. Phys. Lett.*, vol. 51, No. 8, Aug. 24, 1987, pp. 619–621.

Dubowski, J. J., et al., "Cadmium Arsenide Films Prepared by Pulsed Laser Evaporation: Electrical Properties and Lattice Parameters", *Thin Solid Films*, vol. 147, 1987, pp. L51–L54.

Fork, D. K., et al., "Preparation of Oriented Bi—Ca—Sr—Cu—O Thin Films Using Pulsed Laser Deposition", *Appl. Phys. Lett.* vol. 53, No. 4, Jul. 25, 1988, pp. 337–339.

Kwok, H. S., et al., "Growth of Highly Oriented CdS Thin Films by Laser-Evaporation Deposition", *Appl. Phys. Lett.*, vol. 52, No. 13, Mar. 28, 1988, pp. 1095–1097.

(List continued on next page.)

*Primary Examiner*—Anthony McFarland
*Attorney, Agent, or Firm*—Paul R. Martin; Kathleen S. Moss; Pepi Ross

[57] ABSTRACT

A process is disclosed for forming a homogeneous oxide solid phase reaction product of catalytically active material comprising one or more alkali metals, one or more alkaline earth metals, and one or more Group VIII transition metals. The process comprises reacting together one or more alkali metal oxides and/or salts, one or more alkaline earth metal oxides and/or salts, one or more Group VIII transition metal oxides and/or salts, capable of forming a catalytically active reaction product, in the optional presence of an additional source of oxygen, using a laser beam to ablate from a target such metal compound reactants in the form of a vapor in a deposition chamber, resulting in the deposition, on a heated substrate in the chamber, of the desired oxide phase reaction product. The resulting product may be formed in variable, but reproducible, stoichiometric ratios. The homogeneous oxide solid phase product is useful as a catalyst, and can be produced in many physical forms, including thin films, particulate forms, coatings on catalyst support structures, and coatings on structures used in reaction apparatus in which the reaction product of the invention will serve as a catalyst.

22 Claims, 2 Drawing Sheets

OTHER PUBLICATIONS

Mao, X. L., et al., "As-Deposited Sb-Doped Bi—Pb—Sr—Ca—Cu—O Thin Films Prepared by Pulsed Laser Deposition", *Appl. Phys. Lett.*, vol. 57, No. 24, Dec. 10, 1990, pp. 2591–2593.

Narayan, J., et al., "Formation of Thin Superconducting Films by the Laser Processing Method", *Appl. Phys. Lett.*, vol. 51, No. 22, Nov. 30, 1987, pp. 1845–1847.

Singh, Rajiv K., et al., "Pulsed-Laser Evaporation Technique for Deposition of Thin Films: Physics and Theoretical Model", *Physical Review B*, vol. 41, No. 13, May 1, 1990, pp. 8843–8859.

Wagal, S. S., et al., "Diamond-Like Carbon Films Prepared with a Laser Ion Source", *Appl. Phys. Lett.*, vol. 53, No. 3, Jul. 18, 1988, pp. 187–188.

FORMING A TARGET FOR A LASER BEAM FROM ONE OR MORE ALKALI METAL OXIDES, ONE OR MORE ALKALINE EARTH METAL OXIDES, AND ONE OR MORE GROUP VIII TRANSITION METAL OXIDES, CAPABLE OF REACTING TOGETHER TO FORM A CATALYTICALLY ACTIVE HOMOGENEOUS OXIDE SOLID PHASE PRODUCT

↓

ABLATING MATERIAL FROM THE TARGET AS A VAPOR IN A DEPOSITION CHAMBER WITH A LASER BEAM IN THE OPTIONAL PRESENCE OF AN ADDITIONAL SOURCE OF OXYGEN

↓

CONTACTING THE ABLATED MATERIAL WITH A SUBSTRATE MAINTAINED AT A TEMPERATURE SUFFICIENT TO PERMIT THE ABLATED MATERIAL TO REACT TO FORM THE CATALYTICALLY ACTIVE HOMOGENEOUS OXIDE SOLID PHASE PRODUCT

FIG. 2

PROCESS FOR FORMING A HOMOGENEOUS OXIDE SOLID PHASE OF CATALYTICALLY ACTIVE MATERIAL

BACKGROUND OF THE INVENTION

The invention described herein arose in the course of, or under, Contract No. DE-AC03-SF00098 between the United States Department of Energy and the University of California for the operation of the Lawrence Berkeley Laboratory.

1. Field of the Invention

This invention relates to the formation of a thin film homogeneous oxide solid phase of catalytically active materials and a method of making same. More particularly this invention relates to the formation, by laser ablation, of a thin film homogeneous oxide solid phase reaction product of catalytically active materials comprising one or more alkali metals, one or more alkaline earth metals, and one or more Group VIII transition metals.

2. Description of the Related Art

Materials having catalytic activity have been previously formed by thermal reaction of the oxides and/or salts of an alkali metal, an alkaline earth metal, and an Group VIII metal. For example, mixtures of potassium oxide, calcium oxide, and nickel oxide have been physically formed and then heated to form products which contain, potassium, calcium, nickel, and oxygen, and which exhibits varying amounts of catalytic activity for reactions such as the gasification of carbon solids, and/or the oxidative coupling of methane.

While the catalytic activity of such thermally produced potassium/calcium/nickel/ oxygen products are of interest, attempts to reliably reproduce such products have only met with limited success. The stoichiometry of a resulting product, as well as the degree of catalytic activity of that particular product, seems to vary from one processing run to the next, despite the use of identical amounts of the same materials and the use of identical processing procedures.

One of the reasons for the failure to be able to reliably reproduce such a product containing an alkali metal appears to be the relative volatility of the alkali metal compound starting material, compared to the vapor pressures of the other starting materials. For example, potassium oxide ($K_2O$) decomposes at 350° C. and potassium peroxide ($K_2O_2$) melts at 490° C.; compared to a melting point of 2580° C. for calcium oxide (CaO); and a melting point of 1990° C. for nickel oxide (NiO). Thus, it is readily apparent that any attempt to form a product from a mixture of the oxides of potassium, calcium, and nickel by a thermal process will result in a loss of at least a substantial amount of the alkali metal oxide long before the other materials will reach a temperature at which any reaction can occur. Apparently, therefore, what has been formed by the prior art methods is not a homogeneous phase, but rather what may be termed as a solid comprising separate phases of the constituent materials.

Therefore, in the past, one attempting, for example, to form a potassium/calcium/nickel/oxygen product having catalytic activity formed a physical mixture of, for example, the oxides of the respective metals, then heated the physical mixture to, for example, about 800° C., and then tested the resulting product for catalytic activity. If the catalytic activity was sufficient, the product could be used. If the catalytic activity was not sufficient, the inferior product was recycled and the process repeated. Thus, a trial and error process or "empirical method" has been the known manner of producing a potassium/calcium/nickel/oxygen product having catalytic activity. Not surprisingly, such results have not been conducive to the carrying out of further research on such catalytic activity to, for example, optimize the stoichiometric ratios the components for maximum catalytic reactivity, or the reaction parameters needed to producing such a catalyst.

It would, therefore, be desirable to be able to reproducibly form reaction products having catalytic activity, and in various stoichiometric ratios, from the oxides and/or salts of one or more alkali metals, one or more alkaline earth metals, and one or more group VIII transition metals.

SUMMARY OF THE INVENTION

Quite surprisingly, we have now discovered that the respective oxides of one or more alkali metals, one or more alkaline earth metals, and one or more Group VIII transition metals may be reacted together, in the optional presence of an additional source of oxygen, to form a thin film homogeneous oxide solid phase product capable of catalytic activity and which can be reliably reproduced in varying stoichiometric ratios, depending upon the ratios of the starting reactants. The homogeneous oxide solid phase product is formed by laser ablation of a target material comprising the above reactants in a predetermined ratio for a particular stoichiometry, followed by contact by the ablated material with a substrate maintained at a temperature sufficiently high to permit reaction of the ablated material to form the desired oxide phase product.

The process of the invention comprises the steps of: 1) forming a particulate mixture of one or more alkali metal oxides and/or salts, one or more alkaline earth metal oxides and/or salts, and one or more Group VIII transition metal oxides and/or salts, capable of reacting together to form a catalytically active reaction product; 2) forming a target for a laser beam from the particulate mixture; 3) if salts are used rather than oxides, converting the salts to oxides either before or after forming the target from the particulate mixture; 4) ablating material from the target in the form of a vapor by a laser beam in a deposition chamber, in the optional presence of an additional source of oxygen; and 5) contacting the ablated material in the chamber a substrate maintained at a temperature sufficient to permit reaction of the ablated material to form the desired thin film homogeneous oxide solid phase reaction product on the heated substrate.

BRIEF DESCRIPTION OF THE DRAWINGS

FIG. 2 is a flowsheet illustrating one embodiment of the process of the invention.

DETAILED DESCRIPTION OF THE INVENTION

Figure 1:
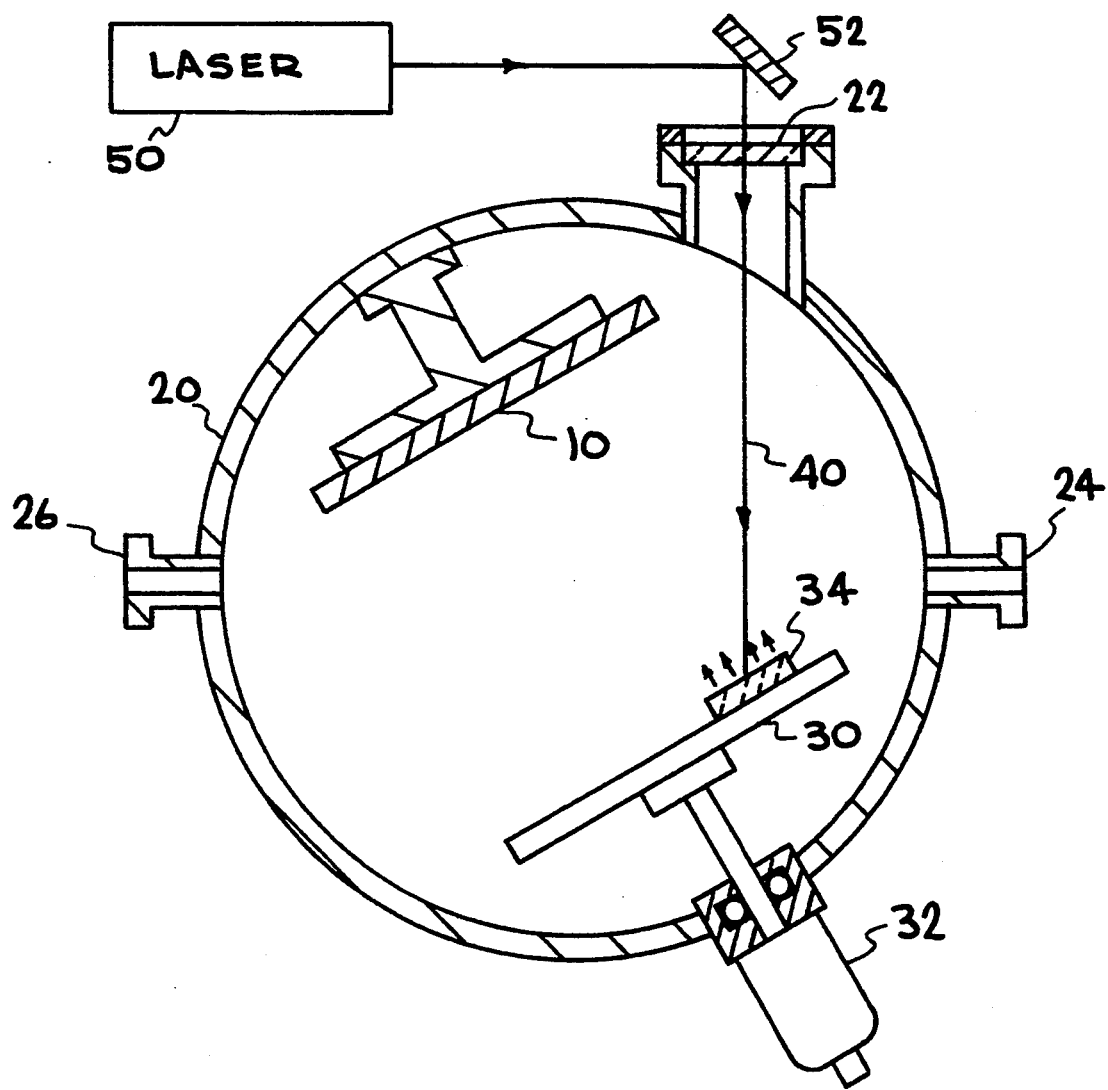
FIG. 1 is a plan view of a typical apparatus which may be used in the practice of the process of the invention to form the novel catalyst material of the invention.

The invention comprises a process for forming a thin film homogeneous oxide solid phase reaction product, by reacting together a mixture of one or more alkali metal oxides and/or salts, one or more alkaline earth metal oxides and/or salts, and one or more Group VIII transition metal oxides and/or salts, capable of reacting together to form a catalytically active reaction product, using a laser beam to ablate from a target such reactants in the form of a vapor in a deposition chamber, in the optional presence of an additional source of oxygen, resulting in the deposition, on a heated substrate in the chamber, of the desired thin film homogeneous oxide solid phase reaction product. The resulting product is formed in a variable, but reproducible, stoichiometric ratio which is useful as a catalyst, and which can be produced in many physical forms, including thin films, particulate forms, coatings on catalyst support structures, and coatings on structures used in reaction apparatus in which the reaction product of the invention will serve as a catalyst.

By use of the term "laser ablation" herein is meant the evaporation or removal of the target material by the focused energy of a laser beam. The bulk target material is converted into vapor components of atoms, ions, clusters, and particles. These vapor then react and deposit on the heated substrate in the form of the desired reaction product.

The Deposition Apparatus

Referring now to FIG. 1, a typical apparatus useful in the practice of the process of the invention to form the desired oxide phase catalytic reaction product is shown. A heated substrate 10 is shown in a stainless steel vacuum chamber 20 having transparent (quartz) windows 22 (only one of which is shown) for viewing and permitting input of a laser beam 40 from a laser beam source 50. Chamber 20 is further provided with a gas entrance port 24, and an evacuation port 26 leading to an evacuation means (not shown) such as a vacuum pump, whereby chamber 10 may be maintained at a pressure ranging from about $10^4$ milliTorr (mTorr) to about 760 Torr, preferably from about 1 mTorr to about 100 mTorr during the ablation and deposition process.

Within chamber 20 is a target support 30 which may be rotated, or moved toward and away from substrate 10 (to vary the target to substrate spacing), by target moving means 32 located outside of chamber 20. Mounted on target support 30 is a target 34, comprising materials capable of forming, by laser ablation and reaction of the resultant vapors, the desired oxide phase catalytic reaction product, as will be described below.

The Heated Substrate

Substrate 10 may comprise any suitable material to which the desired oxide phase catalytic reaction product will adhere. If it is desired to form a thin film of the oxide phase reaction product, substrate 10 may comprise a smooth non-crystalline, polycrystalline, or single crystal surface upon which the oxide phase reaction product will deposit. Substrate 10 may comprise a porous substrate such as, for example, a porous glass or ceramic substrate, if it is desired, for example, to form a high surface catalyst material on a non-reactive porous catalyst support material. Substrate 10 may comprises either a planar surface (as shown in FIG. 1 ) or a shaped object, regardless of its porosity.

Substrate 10 may be heated in any suitable manner, such as by the use of a heated coil (not shown) placed behind substrate 10, or by radiant heat using heat lamps placed adjacent a quartz window in deposition chamber 20, or by any other convenient means suitable for heating the particular form or shape of substrate 10. For non-planar substrates, heating will be accomplished primarily by radiant heat lamps arranged in a typical furnace configuration.

Substrate 10 is heated to maintain a substrate temperature which may range from a minimum of about 70° C., representing the minimum temperature at which the reactants will react to form the desired oxide phase product, up to a temperature just below the decomposition (or volatilization) of the resulting reaction product. Preferably the substrate will be heated sufficiently to maintain a substrate temperature with a range of from about 450° C. to about 800° C. during the deposition.

It should be noted, with regard to the temperature of the substrate, that surprisingly the substrate temperature maintained during the process will preferably exceed the temperature at which the alkali metal oxide and/or salt would have volatilized off during prior art thermal processing. While we do not wish to be bound by any theories as to how the novel process of the invention functions, it is believed that the use of laser ablation to, in essence, instantly form the vapors of the respective reactants, plus the use of an adjacent heated substrate, may permit a substantially instantaneous formation of the desired reaction product on the surface of the substrate before there is an opportunity for any substantial loss of the more volatile alkali metal reactant. In comparison, the prior art thermal processing caused substantial and erratic losses of the highly volatile alkali metal constituent prior to the reaction mass attaining the reaction temperature at which they would react to form the desired product.

Normally substrate 10 will be spaced a distance of from about 3 cm to about 10 cm from target 34, preferably about 4 cm, during the formation of the desired oxide phase reaction product, whereby the reactant vapors ablated from the target by the laser beam, will react and deposit on substrate 10.

The Laser Beam Source

Located outside of chamber 20 is a laser source 50, which may comprise a commercially available pulsed laser source such as a KrF (248 nm) excimer laser. Laser source 50, from which laser beam 40 is focused onto target 34 in chamber 20, may be spaced at any convenient distance from chamber 20, with mirrors, such as illustrated mirror 52, used to deflect laser beam 40 as needed. Laser source 50 should be a source capable of providing an energy density ranging from about 1 Joule/square centimeter ($J/cm^2$) per pulse to about 10 $J/cm^2$, preferably from about 2 to about 3 $J/cm^2$; a repetition rate ranging from about 1 to 100 pulses per second, and a pulse duration ranging from about 100 femtoseconds ($10^{-3}$ seconds) to about 1 millisecond, typically from about 30 picoseconds to about 30 nanoseconds. Such a commercially available pulsed laser source is available from the Questek Company, as a Model 2860 excimer laser. Other suitable laser sources include Lambda Physique excimer lasers, Lumonics excimer lasers, and Spectra Physics nanosecond Nd:YAG lasers. Films have also been successfully fabricated using a Continuum picosecond pulsed Nd:YAG laser. The pulse width of such a laser is approximately 30 ps, and the power density is approximately $3J/cm^2$. Films can also be deposited using excimer laser sources having wavelengths such as KrF (248 nm), XeCl (308 nm), ArF (193 nm), and $N_2$ (337 nm). Also Nd:YAG pulsed lasers operating at 1064 nm, 532 nm, 355 nm and/or 266 nm, with nanosecond or picosecond pulses have been successfully used to fabricate films. Laser beam 40 and target 34 will preferably be positioned to permit laser beam 40 to intercept or strike target 34 at an angle of incidence of from about 20° to about 70°, preferably from about 40° to about 50°, and typically about 45°.

The Target (The Reactant Materials)

The material comprising target 34, which will be ablated by laser beam 40 to form the desired thin film of homogeneous oxide solid phase material on substrate 10, comprises a mixture of one or more alkali metal oxides and/or salts, one or more alkaline earth metal oxides and/or salts, and one or more Group VIII transition metal oxides and/or salts capable of reacting together to form a catalytically active thin film of homogeneous oxide solid phase reaction product. While it is within the scope of the invention to use either oxides or salts of the above mentioned metals, the use of oxides are preferred since this will provide at least a portion of the source of oxygen needed for the desired oxide phase catalyst reaction product. When salts are used instead of oxides, the salts are preferably converted to oxides, as will be explained below, either before or after formation of the target, but in any event prior to the laser ablation step.

By use of the term "oxides" in connection with the above mentioned metals is meant to include various hydrated oxide forms, including hydroxides, as well as dehydrated forms. Typical salts of the above mentioned metals which may be used instead of such oxides include nitrates, acetates, sulfates, and oxalates. Particularly preferred salts are those in which the anion will decompose upon heating to a temperature of less than about 1000° C., such as, for example, the nitrates, so that the anion of the salt does not become a source of contamination of the catalyst product. However, it must be noted that special care must be taken, in those instances where reaction of the salt with other reactants is highly exothermic.

By use of the term "alkali metal oxides and/or salts" is meant the oxides and/or salts of lithium, sodium, potassium, rubidium, and cesium, as well as mixtures of two or more such alkali metals. Preferably, however, the one or more alkali metals will comprise lithium, sodium, or potassium, or mixtures of two or more of these three alkali metals. use of the term "alkaline earth metal oxides and/or salts" is meant the oxides and/or salts of magnesium, calcium, strontium, and barium. Preferably, however, the alkaline earth metal will comprise calcium, barium, or magnesium, or mixtures of two or more of these three alkaline earth metals.

By use of the term "Group VIII transition metal oxides and/or salts" is meant the oxides and/or salts of iron, cobalt, nickel and the six platinum metals, ruthenium, rhodium, palladium, osmium, iridium, and platinum. Preferably, however, the one or more Group VIII transition metals will comprise nickel, cobalt, or a mixture of same.

The amount of the one or more alkali metal oxides and/or salts used to form the target will usually range from about 0.1 to about 1 mole percent ratio of the total of the three types of metals, with the balance consisting essentially of the sum of the one or more alkaline earth metal oxides and/or salts and the one or more Group VIII transition metal oxides and/or salts. The mole ratio of these latter two types of reactants may range from about 10:1 to about 1:10. Thus, typical mole ratios of, for example, potassium/calcium/nickel oxides and/or salts present in a target might be 1 mole % potassium oxide, 9 mole % calcium oxide, and 90 mole % nickel oxide; or 1 mole % potassium oxide, 90 mole % calcium oxide, and 9 mole % nickel oxide.

Preferably the reactants which will form the target material are in particulate form and are first thoroughly mixed together to form a homogeneous mixture and then pressed into a suitable shape to form target 34 which will be mounted in chamber 20 for ablation by laser beam 40. If desired, the particulate mixture may be heated (either before or after the molding step) sufficiently to dry off any undesirable moisture. However, care must be exercised in not heating the particulate mixture up to a temperature at which any substantial decomposition of the alkali metal salt and/or oxide would occur.

The particle size of the reactants will preferably range from about 0.1 microns to about 100 microns. Larger or smaller particle sizes may be used, but smaller size particles may be difficult to handle and/or to mold into the desired target shape, while larger particle sizes may interfere with the desired homogeneous nature of the particle mixtures. While any size and shape target may be used, typically a target will comprise a circular disk ranging in diameter from about 0.5 cm. to about 6 cm., with a typical thickness ranging from about 2 mm. to about 20 min. and formed by pressing the particulate mass in a press at a pressure of from about 5000 lbs/in$^2$ to about 30,000 lbs/in$^2$, typically about 20,000 lbs/in$^2$. The resultant target disc is then mounted on target support 30 in chamber 20.

As mentioned above, when a salt (or salts) is used instead of an oxide, the salt should be converted to an oxide prior to the laser ablation step. This conversion could be carried out either before or after the forming of the particulate mixture into the desired target. The conversion is usually carried out by thermal decomposition of the salt (or salts), at a temperature under about 1000° C., in the presence of a source of oxygen such as, for example, air. The oxide formation may also be carried out by any other means capable of providing the desired conversion such as, for example, by use of a laser.

The Optional Oxygen Source

As previously mentioned above, chamber 20 is provided with a gas entrance port 24. Through this inlet port may be flowed an optional source of additional oxygen into chamber 20. Such oxygen, for example, may be required when the target material does not comprise oxides capable of decomposing to liberate sufficient oxygen needed for the reaction product. In a preferred mode of operation, such an additional source of oxygen is always utilized to ensure that the oxide phase of the desired catalyst reaction product will always be formed and deposited on substrate 10 during the reaction between the vapors of the reactants ablated from target 34 by laser beam 40. To provide a sufficient amount of such an optional source of oxygen during the reaction, preferably an oxygen partial pressure ranging from about 1 milliTorr to about 100 milliTorr, and typically about 10 millitorr, is maintained in chamber 20 during the reaction.

Example

To further illustrate the process of the invention, a 1 cm. diameter target, having a thickness of about 2 min. may be formed by first thoroughly mixing together 1 mole of particulate potassium oxide, about 49.5 mole % of particulate calcium oxide, and about 49.5 mole % of particulate nickel oxide. The particulate mixture is then pressed into the desired target shape using a pressure of about 20,000 psi.

The resulting target is then mounted in a deposition chamber at a distance of about 4 cm. from a MgO substrate which is maintained at a temperature of about 600° C., while an oxygen pressure of about 10 milliTorr is maintained in the chamber. A pulsed excimer laser, operated at a 5 Hz repetition rate with a 350 mJ/pulse and an energy density of about 5 J/cm$^2$, is directed at the target which is mounted to permit the laser beam to strike the target at a 45° angle of incidence. The deposition may be carried out for about 15 minutes to provide a thin film thickness on the heated substrate of about 1500 Å, after which the laser may be turned off. The coated substrate can then be allowed to cool to room temperature over about a half hour period, while maintaining the oxygen atmosphere at about 10 milliTorr.

The resultant film may be measured by Energy Dispersive X-ray analysis (EDX) to determine the stoichiometric ratios of the potassium, calcium, and nickel in the thin film product. When the reaction is repeated to form a second film under identical conditions, x-ray diffraction data will show that the identical compound is formed both times, comprising a thin film of a homogeneous oxide solid phase containing potassium, calcium, and nickel. Similar results may be obtained using the reactants in other mole ratios, or by substituting lithium, sodium, rubidium, or cesium for potassium as the alkali metal reactant, substituting magnesium, strontium, or barium calcium as the alkaline earth metal, or by substituting other Group VIII transition metals for the nickel reactant. The resultant product will be found to be useful as a catalyst for gasification of carbon solids, or for oxidative coupling of methane.

Thus, the process of the invention results in the formation of a catalytically active single oxide phase reaction product containing one or more alkali metals, one or more alkaline earth metals, and one or more Group VIII transition metals which can be formed in a number of shapes and forms in a predetermined and repeatable stoichiometry controlled by the initial mole ratio of the respective one or more alkali metals, one or more alkaline earth metals, and one or more Group VIII transition metals reactants used in forming the target to be ablated by the laser beam.

Having thus described the invention what is claimed is:

1. A process for forming a homogeneous oxide solid phase reaction product capable of catalytic activity which comprises the steps of:
   a) forming a single target for a laser beam from a mixture containing a source of oxygen and capable of forming said catalytically active product consisting essentially of:
      i) at least about 0.1 mole percent of one or more alkali metal oxides and/or salts;
      ii) one or more alkaline earth metal oxides and/or salts; and
      iii) one or more Group VIII transition metal oxides and/or salts; where the mole ratio of said one or more alkaline earth metal oxides and/or salts and said one or more Group VIII transition metal oxides and/or salts ranges from 10:1 to 1:10;
   b) convening any salts present in said target to oxides, either prior to or after said step of forming said target;
   c) ablating material from said target by a laser beam in a deposition chamber; and
   d) contacting said ablated material in said chamber with a substrate maintained at a temperature sufficient to permit said ablated materials to react to form said oxide phase reaction product on said heated substrate.

2. The process of claim 1 which further includes optionally providing an additional source of oxygen in said chamber independent of said target.

3. The process of claim 1 wherein said one or more alkali metal oxides and/or salts, one or more alkaline earth metal oxides and/or salts, and one or more Group VIII transition metal oxides and/or salts are each in particulateform prior to said step of forming said target.

4. The process of claim 1 wherein said one or more alkali metal oxides and/or salts are selected from the group consisting of oxides and/or salts of lithium, sodium, potassium, rubidium, cesium, and mixtures thereof.

5. The process of claim 1 wherein said one or more alkaline earth metal oxides and/or salts are selected from the group consisting of oxides and/or salts of magnesium, calcium, strontium, barium, and mixtures thereof.

6. The process of claim 1 wherein said one or more Group VIII transition metal oxides and/or salts are selected from the group consisting of oxides and/or salts of iron, cobalt, nickel, ruthenium, rhodium, palladium, osmium, iridium, platinum, and mixtures thereof.

7. The process of claim 1 wherein said heated substrate is heated to a temperature of at least about 70° C. during said laser ablation and contact by said substrate with said ablated vapors of material.

8. The process of claim 1 wherein said heated substrate is heated to a temperature of from about 450° C. to about 800° C. during said laser ablation and contact by said substrate with said ablated vapors of material.

9. A process for forming a homogeneous oxide solid phase reaction product capable of catalytic activity which comprises the steps of:
   a) forming a single target for a laser beam from a particulate mixture consisting essentially of:
      i) at least about 0.1 mole percent of one orpercent of one or more alkali metal oxides selected from the group consisting of an oxide of lithium; an oxide of sodium, an oxide of potassium; and mixtures of same;
      ii) one or more alkaline earth metal oxides selected from the group consisting of an oxide of magnesium, an oxide of calcium, an oxide of barium, and mixtures of same; and
      iii) one or more Group VIII transition metal oxides selected from the group consisting of an oxide of cobalt, an oxide of nickel, and mixtures of same; where the mole ratio of said one or more alkaline earth metal oxides and said one or more Group VIII transition metal oxides ranges from 10:1 to 1:10, and said particulate mixture is capable of forming said catalytically active product;
   b) forming a single target for a laser beam from said particulate mixture;
   c) ablating material from said target in the form of a vapor by a laser beam directed at said target in a deposition chamber in the optional presence of a source of oxygen; and d) contacting said ablated vapor in said chamber with a substrate maintained at a temperature of at least about 450° C. to form said oxide phase reaction product on said heated substrate.

10. The process of claim 9 wherein said one or more alkali metal oxides and/or salts are selected from the group consisting of oxides and/or salts of lithium, sodium, potassium and mixtures thereof.

11. The process of claim 9 wherein said one or more alkaline earth metal oxides and/or salts are selected from the group consisting of oxides and/or salts of magnesium, calcium, barium, and mixtures thereof.

12. The process of claim 9 wherein said one or more Group VIII transition metal oxides and/or salts are selected from the group consisting of oxides and/or salts of cobalt, nickel, and mixtures thereof.

13. The process of claim 9 which further includes maintaining said substrate at a distance from said target ranging from about 3 cm. to about 10 cm.

14. A process for forming a thin film homogeneous oxide solid phase reaction product capable of catalytic activity which comprises the steps of:

a) forming a particulate mixture consisting essentially of:
   i) at least about 0.1 mole percent of one or more alkali metal oxides selected from the group consisting of an oxide of lithium; an oxide of sodium, an oxide of potassium; and mixtures of same;
   ii) one or more alkaline earth metal oxides selected from the group consisting of an oxide of magnesium, an oxide of calcium, an oxide of barium, and mixtures of same; and
   iii) one or more Group VIII transition metal oxides selected from the group consisting of an oxide of cobalt, an oxide of nickel, and mixtures of same;
   where the mole ratio of said one or more alkaline earth metal oxides and said one or more Group VIII transition metal oxides ranges from 10:1 to 1:10, and said particulate mixture is capable of forming said catalytically active product;

b) forming a single target for a laser beam from siad particulate mixture;

c) ablating material from said target in the form of a vapor by a laser beam directed at said target in a deposition chamber in the optional presence of a source of oxygen; and d) contacting said ablated vapor in said chamber with a substrate maintained at a temperature of at least about 450° C. to form said oxide phase reaction product on said heated substrate.

15. The process of claim 14 which further includes maintaining said substrate at a distance from said target ranging from about 3 cm. to about 10 cm.

16. The process of claim 14 which further includes positioning said laser beam and said target to provide an angle of incidence of said laser beam on said target ranging from about 20° to about 70°.

17. The process of claim 14 wherein said one or more alkali metal oxides consists essentially of potassium oxide.

18. The process of claim 14 wherein said one or more alkaline earth metal oxides consists essentially of calcium oxide.

19. The process of claim 14 wherein said one or more Group VIII transition metal oxides consists essentially of nickel oxide.

20. A homogeneous oxide solid phase reaction product of catalytically active material comprising one or more alkali metals, one or more alkaline earth metals, and one or more Group VIII transition metals formed by the steps of:

a) forming a single target for a laser beam from a particulate mixture consisting essentially of:
   i) at least about 0.1 mole percent of one or more alkali metal oxides and/or salts;
   ii) one or more alkaline earth metal oxides and/or salts; and
   iii) one or more Group VIII transition metal oxides and/or salts; where the mole ratio of said one or more alkaline earth metal oxides and/or salts and said one or more Group VIII transition metal oxides and/or salts range from 10:1 to 1:10:

b) converting any salts present in said target to oxides, either prior to or after said step of forming said target;

c) ablating material from said target in the form of a vapor by a laser beam in a deposition chamber in the optional presence of an additional source of oxygen; and d) contacting said ablated material in said chamber with a substrate maintained at a temperature sufficient to permit said ablated materials to react to form said homogeneous oxide solid phase reaction product on said heated substrate.

21. The homogeneous oxide solid phase reaction product of claim 20 wherein:

a) said one or more alkali metal oxides are selected from the group consisting of an oxide of lithium, an oxide of sodium, an oxide of potassium, and mixtures of same;

b) said one or more alkaline earth metal oxides are selected from the group consisting of an oxide of magnesium, an oxide of calcium, an oxide of barium, and mixtures of same; and c) said one or more Group VIII transition metal oxides are selected from the group consisting of an oxide of cobalt, an oxide of nickel, and mixtures of same.

22. The homogeneous oxide solid phase reaction product of claim 21 wherein said one or more alkali metal oxides consists essentially of an oxide of potassium, said one or more alkaline earth metal oxides consists essentially of an oxide of calcium, and said one or more Group VIII transition metal oxides consists essentially of an oxide of nickel.

* * * * *